(12) United States Patent
Yasuoka et al.

(10) Patent No.: US 12,115,594 B2
(45) Date of Patent: Oct. 15, 2024

(54) WELDING METHOD AND WELDING APPARATUS

(71) Applicant: FURUKAWA ELECTRIC CO., LTD., Tokyo (JP)

(72) Inventors: Tomomichi Yasuoka, Tokyo (JP); Takashi Kayahara, Tokyo (JP); Ryosuke Nishii, Tokyo (JP); Koji Kirikae, Tokyo (JP); Keigo Matsunaga, Tokyo (JP); Takashi Shigematsu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 505 days.

(21) Appl. No.: 17/183,495

(22) Filed: Feb. 24, 2021

(65) Prior Publication Data

US 2021/0178514 A1    Jun. 17, 2021

Related U.S. Application Data

(63) Continuation of application No. PCT/JP2019/034801, filed on Sep. 4, 2019.

(30) Foreign Application Priority Data

Sep. 4, 2018 (JP) .................... 2018-165082

(51) Int. Cl.
*B23K 26/067* (2006.01)
*B23K 26/06* (2014.01)
(Continued)

(52) U.S. Cl.
CPC ........ *B23K 26/067* (2013.01); *B23K 26/0648* (2013.01); *B23K 26/08* (2013.01);
(Continued)

(58) Field of Classification Search
CPC .. B23K 26/067; B23K 26/21; B23K 26/0648; B23K 26/08; B23K 26/32;
(Continued)

(56) References Cited

U.S. PATENT DOCUMENTS 9,044,824 B2    6/2015  Olsen
2009/0266801 A1  10/2009  Oku et al.
(Continued)

FOREIGN PATENT DOCUMENTS

CN        102089114 A    6/2011
CN        106925887 A    7/2017
(Continued)

OTHER PUBLICATIONS

International Search Report issued Nov. 26, 2019 in PCT/JP2019/034801 filed on Sep. 4, 2019, 2 pages.
(Continued)

*Primary Examiner* — Janie M Loeppke
*Assistant Examiner* — Theodore J Evangelista
(74) *Attorney, Agent, or Firm* — Oblon, McClelland, Maier & Neustadt, L.L.P.

(57) ABSTRACT

A welding method includes: emitting laser beam toward a workpiece including a metal to melt and weld a part of the workpiece, the part being where the laser beam has been emitted to. Further, the laser beam includes a main power region and at least one auxiliary power region, a power of the main power region is larger than a power of each of the at least one auxiliary power region, and a ratio between the power of the main power region and the total of powers of the at least one auxiliary power region is in a range of 144:1 to 1:9.

15 Claims, 13 Drawing Sheets

(51) Int. Cl.
    *B23K 26/08*   (2014.01)
    *B23K 26/21*   (2014.01)
    *B23K 26/32*   (2014.01)
    *B23K 103/04*  (2006.01)
    *B23K 103/10*  (2006.01)

(52) U.S. Cl.
    CPC .............. *B23K 26/21* (2015.10); *B23K 26/32* (2013.01); *B23K 2103/04* (2018.08); *B23K 2103/10* (2018.08)

(58) Field of Classification Search
    CPC ............ B23K 2103/10; B23K 2103/04; B23K 26/073; B23K 26/064
    See application file for complete search history.

(56) References Cited

U.S. PATENT DOCUMENTS

| | | | |
|---|---|---|---|
| 2011/0095002 | A1 | 4/2011 | Katayama et al. |
| 2017/0182599 | A1 | 6/2017 | Tsukui |
| 2018/0009062 | A1 | 1/2018 | Sbetti |
| 2019/0118299 | A1* | 4/2019 | Kangastupa ......... B23K 26/322 |

FOREIGN PATENT DOCUMENTS

| | | | |
|---|---|---|---|
| CN | 107584205 | A | 1/2018 |
| JP | 2001-047272 | A | 2/2001 |
| JP | 2010-508149 | A | 3/2010 |
| JP | 2012236228 | A * | 12/2012 |
| JP | 2015-205327 | A | 11/2015 |
| JP | 2018-51607 | A | 4/2018 |
| JP | 2018051607 | A * | 4/2018 |
| WO | WO 2018/011456 | A1 | 1/2018 |

OTHER PUBLICATIONS

Combined Chinese Office Action and Search Report issued Mar. 22, 2022 in Chinese Patent Application No. 201980055686.5 (with unedited computer generated English translation), 19 pages.

Japanese Office Action issued on Apr. 4, 2023 in Japanese Patent Application No. 2020-541269 (with unedited computer-generated English translation), 7 pages.

Supplementary European Search Report issued Jun. 7, 2022 in European Patent Application No. 19856929.5, 8 pages.

\* cited by examiner

WELDING METHOD AND WELDING APPARATUS

CROSS-REFERENCE TO RELATED APPLICATION(S)

This application is a continuation of International Application No. PCT/JP2019/034801, filed on Sep. 4, 2 2019 which claims the benefit of priority of the prior Japanese Patent Application No. 2018-165082, filed on Sep. 4, 2018, the entire contents of which are incorporated herein by reference.

BACKGROUND

The present disclosure relates to welding methods and welding apparatuses.

Background

Laser welding has been known as one of methods of welding workpieces made of metallic materials. Laser welding is a welding method in which area to be welded in a workpiece is irradiated with laser beam and the area is melted by the energy of the laser beam. A liquid pool of the metallic material melted, the liquid pool being called a molten pool, is formed at the area irradiated with the laser beam, and welding is thereafter done by solidification of the molten pool.

In irradiation of a workpiece with laser beam, a profile of the laser beam may be shaped depending on the purpose. For example, a technique for shaping a profile of laser beam when the laser beam is used to cut a workpiece has been known (see, for example, Japanese National Publication of International Patent Application No. 2010-508149).

During such welding, scattered matter called sputter is known to be generated from molten pools. This sputter is molten metal that has been scattered and it is important to reduce generation of sputter to prevent processing defects. Since sputter is molten metal that has been scattered, when sputter is generated, some of the metallic material at the welded spot is lost. That is, if generation of sputter is increased, the amount of the metallic material at the welded spot will become insufficient and problems, such as insufficient strength, may thus be caused. Furthermore, the generated sputter will adhere to the surroundings of the welded spot, and if the adhered sputter is peeled off later and adheres to a piece of equipment, such as an electric circuit, the electric circuit may not function properly. Therefore, performing welding of parts for electric circuits is sometimes difficult.

SUMMARY

There is a need for providing a welding method and a welding apparatus that enable reduction in generation of sputter.

According to an embodiment, in a welding method, laser beam and a workpiece including a metal are moved relatively to each other while the laser beam is being emitted to the workpiece to sweep the workpiece with the laser beam and melt and weld an area of the workpiece, the area being where the laser beam has been emitted to; the laser beam is formed of a main power region and at least one auxiliary power region having at least a part that is in front, in a sweep direction, of the main power region; a power of the main power region is larger than a power of each of the at least one auxiliary power region; and a ratio between the power of the main power region and the total of powers of the at least one auxiliary power region is in a range of 144:1 to 1:9.

According to an embodiment, a welding apparatus includes: a laser oscillator; and an optical head that receives light emitted from the laser oscillator to generate laser beam, and emits the generated laser beam to a workpiece to melt and weld an area of the workpiece, the area being where the laser beam has been emitted to. Further, the laser beam includes a main power region and at least one auxiliary power region, a power of the main power region is larger than a power of each of the at least one auxiliary power region, and a ratio between the power of the main power region and the total of powers of the at least one auxiliary power region is in a range of 144:1 to 1:9.

DETAILED DESCRIPTION

Embodiments of the present disclosure will be described in detail below while reference is made to the appended drawings. The present disclosure is not limited by the embodiments described below. The same reference sign will be assigned to elements that are the same or corresponding to each other, as appropriate, throughout the drawings.

First Embodiment

Figure 1:
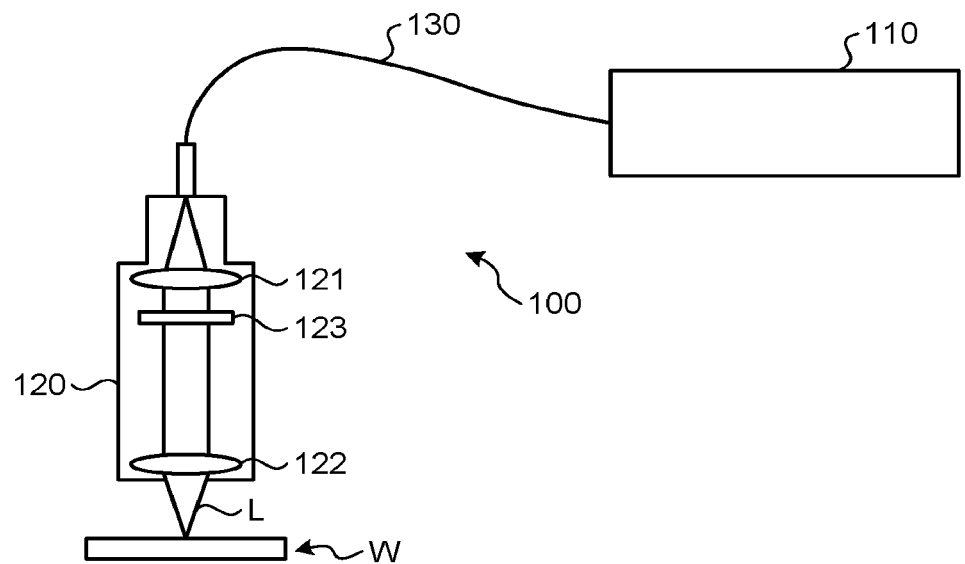
FIG. 1 is a diagram illustrating a schematic configuration of a laser welding apparatus according to a first embodiment.

FIG. 1 is a diagram illustrating a schematic configuration of a laser welding apparatus according to a first embodiment. A laser welding apparatus 100 includes a laser device 110, an optical head 120, and an optical fiber 130 that connects the laser device 110 and the optical head 120 to each other. A workpiece W includes a metal, such as iron or aluminum. The workpiece W is made of, for example: a ferroalloy, such as stainless steel; or an aluminum alloy, and is plate-shaped, with a thickness in a range of, for example, about 1 mm to 10 mm.

The laser device 110 includes a laser oscillator and is configured to output laser beam having a power of, for example, a few kilowatts (kW). For example, the laser device 110 may include plural semiconductor laser elements inside the laser device 110 and be configured to be capable of outputting multi-mode laser beam having a power of a few kilowatts (kW) as the total output of the plural semiconductor laser elements. Furthermore, the laser device 110 may include any of various laser beam sources, such as fiber lasers, YAG lasers, and disk lasers. The optical fiber 130 guides laser beam output from the laser device 110 to input the laser beam to the optical head 120.

The optical head 120 is an optical device for emitting the laser beam input from the laser device 110, to the workpiece W. The optical head 120 includes a collimator lens 121 and a condenser lens 122. The collimator lens 121 is an optical system for making input laser beam into collimated light. The condenser lens 122 is an optical system for condensing the collimated laser beam and emitting the condensed collimated laser beam as laser beam L, to the workpiece W.

To sweep the workpiece W with the laser beam L while irradiating the workpiece W with the laser beam L, the optical head 120 is configured such that position of the optical head 120 is able to be changed relatively to the workpiece W. Examples of a method of changing the relative position to the workpiece W include: moving the optical head 120 itself; and moving the workpiece W. That is, the optical head 120 may be configured to be capable of sweeping, with the laser beam L, the workpiece W that has been fixed. Or, a position irradiated with the laser beam L from the optical head 120 may be fixed and the workpiece W may be held to be movable relatively to the laser beam L that has been fixed.

Figure 2:
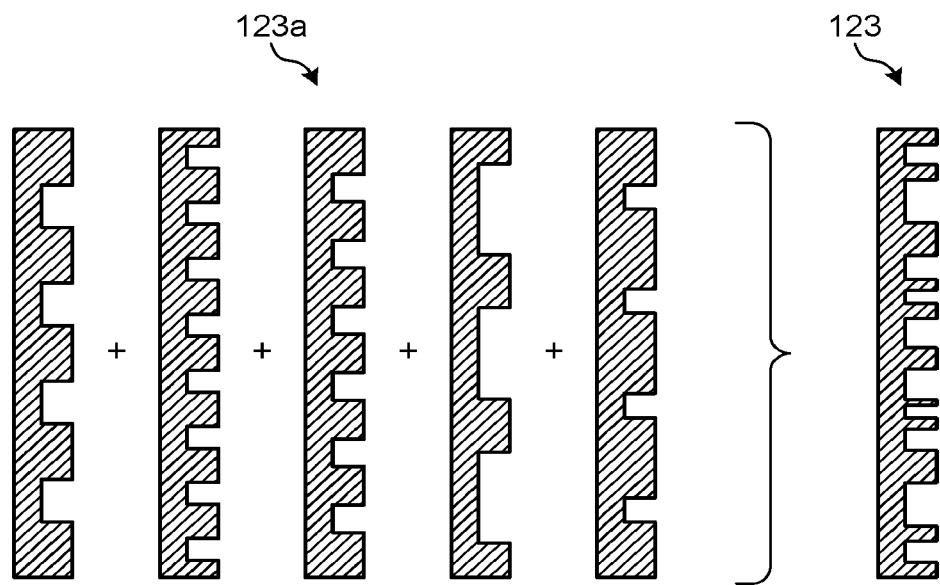
FIG. 2 is a schematic diagram for explanation of a diffractive optical element.

The optical head 120 includes a diffractive optical element 123 that is placed between the collimator lens 121 and the condenser lens 122, the diffractive optical element 123 serving as a beam shaper. The diffractive optical element 123 referred to herein is also called a DOE (diffractive optical element) and is integrally formed of plural diffraction gratings 123a having different periods, as conceptually illustrated in FIG. 2. The diffractive optical element 123 is able to form a beam shape by doing one or both of: bending input laser beams in directions influenced by the respective diffraction gratings; and superimposing them.

The diffractive optical element 123 splits laser beam input from the collimator lens 121 into plural beams. Specifically, the diffractive optical element 123 splits laser beam to generate a main beam and at least one auxiliary beam. The diffractive optical element 123 generates the main beam and the auxiliary beam or beams such that at least a part of the at least one auxiliary beam is positioned in front, in a sweep direction, of the main beam. The laser beam L is thereby formed of the main beam and the at least one auxiliary beam.

Figure 3:
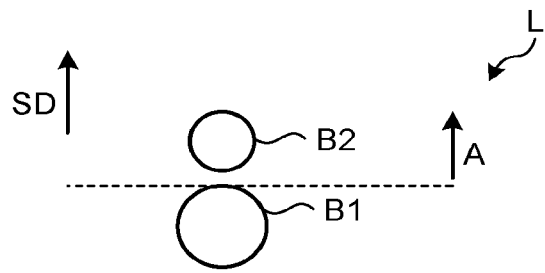
FIG. 3 is a diagram illustrating an example of a cross-sectional shape of laser beam.

The laser beam L shaped by the diffractive optical element 123 is formed of a main beam B1 and an auxiliary beam B2, like an example of a cross-sectional shape of the laser beam L illustrated in FIG. 3, the cross-sectional shape being on a plane perpendicular to the direction in which the laser beam L travels. A sweep direction SD is the direction of movement of the laser beam L, the movement being relative to the workpiece W. The auxiliary beam B2 is positioned in front, in the sweep direction, of the main beam B1. Being in front of the main beam B1 means, as illustrated in FIG. 3, being in a region A defined by a broken line perpendicular to the sweep direction SD, the broken line passing a position at a beam diameter of the main beam B1, the position being forward in the sweep direction. The position of the auxiliary beam B2 is not limited to this example, and as long as the auxiliary beam B2 is positioned somewhere in the region A, the auxiliary beam B2 is able to be regarded as being positioned in front of the main beam B1.

Furthermore, each of the main beam B1 and the auxiliary beam B2 has, in a radial direction of its beam cross-section, a power distribution having a Gaussian form, for example. In FIG. 3, the diameters of circles depicting the main beam B1 and the auxiliary beam B2 are beam diameters of these beams. A beam diameter of each beam is defined as a diameter of a region including a peak of that beam and having intensity that is $1/e^2$ or more of the intensity of that peak. If the beam is not circular, the beam diameter is defined in this specification as a length of a region having intensity that is $1/e^2$ or more of the peak intensity, the length being along a longer axis (for example, a major axis) passing the vicinity of the center of the beam or along a shorter axis (for example, a minor axis) perpendicular to the longer axis (major axis). In addition, the power of each beam is power in the region including the peak of that beam and having intensity that is $1/e^2$ or more of the peak intensity. The power of the main beam B1 is larger than the power of the auxiliary beam B2.

The power distribution profile of at least the main beam B1 is preferably sharp to some degree. When the power distribution profile of the main beam B1 is sharp to some degree, the depth melted is able to be increased in welding of the workpiece W, and welding strength is thus able to be attained and occurrence of poor welds is thus able to be lessened more ideally. If a beam diameter is used as an index of sharpness of the main beam B1, the main beam B1 preferably has a beam diameter of 600 μm or less and more preferably 400 μm or less. When the main beam B1 is sharp in form, the power for attaining the same melted depth is able to be reduced and the processing speed is able to be increased. Therefore, the electric power consumption by the laser welding apparatus 100 is able to be reduced and the processing efficiency is able to be improved. The power distribution of the auxiliary beam B2 may be as sharp as the main beam B1.

Beam diameters may be designed by appropriately setting specifics of the laser device 110, optical head 120, and optical fiber 130 that are used. For example, beam diameters may be set by setting beam diameters of laser beam input to the optical head 120 from the optical fiber 130, or setting the optical systems, such as the diffractive optical element 123 and lenses 121 and 122.

When welding is performed using the laser welding apparatus 100, firstly, the workpiece W is placed in a region, to which laser beam L is emitted. Subsequently, the laser beam L and the workpiece W are moved relatively to each other while the workpiece W is irradiated with the laser beam L including the main beam B1 and the auxiliary beam B2 that have been split by the diffractive optical element 123, to perform sweeping with the laser beam L, and welding is performed by melting an area of the workpiece W, the area having been irradiated with the laser beam L. In FIG. 1, the sweep direction is, for example, the direction pointing out from the plane of the page of the figure or the direction pointing into the page of the figure. Welding of the workpiece W is thereby done.

In this welding, positioning the auxiliary beam B2 in front, in the sweep direction SD, of the main beam B1 in the laser beam L enables reduction in generation of sputter.

Figure 4:
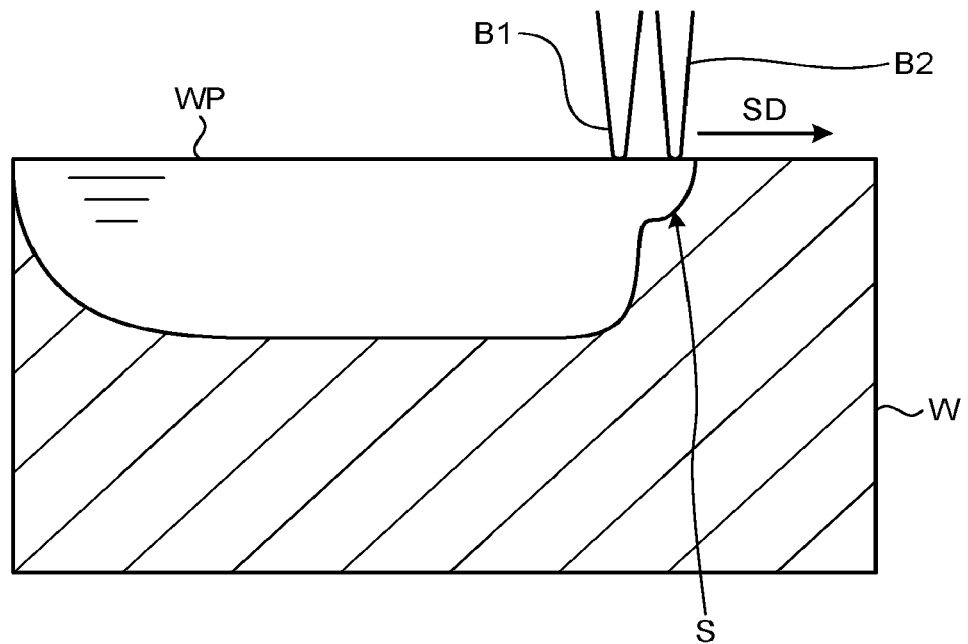
FIG. 4 is a diagram illustrating a situation where laser beam melts a workpiece.

FIG. 4 is a diagram illustrating a situation where laser beam melts a workpiece. As illustrated in FIG. 4, in the laser welding apparatus 100 according to the first embodiment and a welding method using the laser welding apparatus 100, the laser beam L includes the main beam B1 and the auxiliary beam B2. A power density of the main beam B1 is, for example, at least a power density that enables a key hole to be generated. A key hole is a depression or a hole that is generated by pressure of metallic vapor generated when the workpiece W is melted by the high power density of a laser beam. The auxiliary beam B2 having a power smaller than that of the main beam B1 is positioned in front, in the sweep direction SD, of the main beam B1 having a large power. Furthermore, the power density of the auxiliary beam B2 is a power density that enables the workpiece W to be melted: in the presence of the main beam B1; or by the auxiliary beam B2 itself alone. Therefore, a molten pool WP is formed as a molten region, the molten pool WP having a region that is in front of a position irradiated with the main beam B1, the region being shallower than the depth melted by the main beam B1. This region will be called a shallow region S for the sake of convenience.

Melt intensity regions of the main beam B1 and the auxiliary beam B2 may overlap each other but do not necessarily overlap each other as long as their molten pools overlap each other. The melt intensity region formed by the main beam B1 is preferably able to reach the molten pool formed by the auxiliary beam B2 before the molten pool solidifies. As described above, the power densities of the main beam B1 and the auxiliary beam B2 are power densities enabling the workpiece W to be melted, and the melt intensity region refers to the range of the laser beam having the power density enabling the workpiece W to be melted, the range being around the main beam B1 or the auxiliary beam B2.

In the laser welding apparatus 100 according to the first embodiment and the welding method using the laser welding apparatus 100, the presence of the shallow region S in front of the position irradiated with the main beam B1 stabilizes the molten pool WP in the vicinity of the position irradiated with the main beam B1. As described above, sputter is molten metal that has been scattered and thus stabilization of the molten pool WP in the vicinity of the position irradiated with the main beam B1 is considered to lead to reduction in generation of sputter.

In FIG. 3, the ratio between the power of the main beam B1 and the power of the auxiliary beam B2 is preferably in the range of 144:1 to 1:9.

Figure 5A:
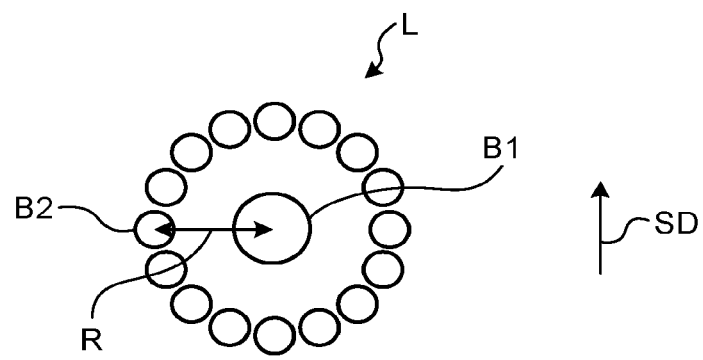
FIG. 5A is a schematic diagram illustrating an example of beam arrangement.
Figure 5B:
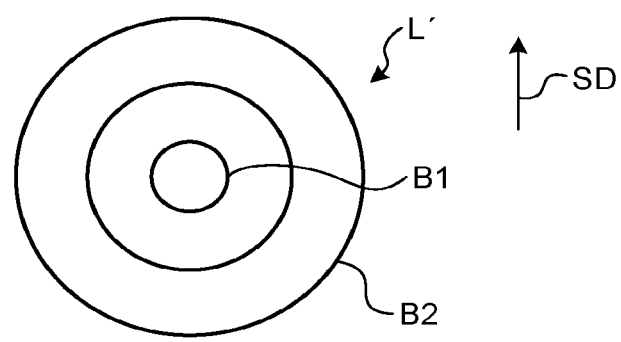
FIG. 5B is a schematic diagram illustrating an example of beam arrangement.
Figure 5C:
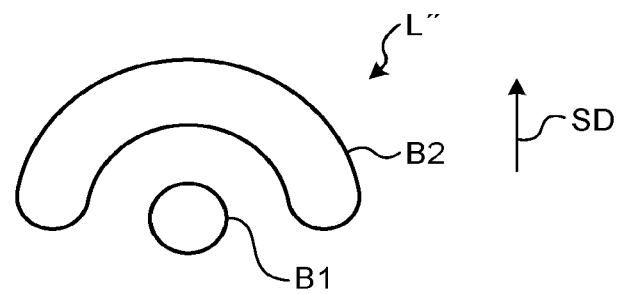
FIG. 5C is a schematic diagram illustrating an example of beam arrangement.

FIG. 5A to FIG. 5C are schematic diagrams illustrating examples of beam arrangement. FIG. 5A to FIG. 5C each illustrate arrangement of plural beams on a surface of the workpiece W, the surface being irradiated with laser beam L. In an example illustrated in FIG. 5A, laser beam L includes a main beam B1 and plural auxiliary beams B2 that have been split by the diffractive optical element 123. In the example illustrated in FIG. 5A, the number of the auxiliary beams B2 is 16. The 16 auxiliary beams B2 are positioned to surround the periphery of the main beam B1. Specifically, the 16 auxiliary beams B2 are positioned to form an approximate ring shape having a radius R between their peaks, the main beam B1 being in the center of the approximate ring shape. Furthermore, the 16 auxiliary beams B2 may be said to be positioned to form an approximate regular hexadodecagon shape having a distance R between its center and vertex, the main beam B1 being in the center of the approximate regular hexadodecagon shape.

Like laser beam L' illustrated in FIG. 5B, plural auxiliary beams B2 may continuously overlap each other to form an approximate ring shape surrounding the periphery of the main beam B1. Furthermore, like laser beam L" illustrated in FIG. 5C, an arc shape that is a part of an approximate ring shape surrounding the periphery of the main beam B1 may be formed.

In the example illustrated in FIG. 5A, seven auxiliary beams B2 are positioned in front, in the sweep direction SD, of the main beam B1. Two auxiliary beams B2 are positioned laterally, in the direction perpendicular to the sweep direction SD, with respect to the main beam B1. Seven auxiliary beams B2 are positioned in back, in the sweep direction SD, of the main beam B1.

Furthermore, the ratio between the power of the main beam B1 and the total of powers of the 16 auxiliary beams B2 is in a range of 9:1 to 1:9. Therefore, if this ratio is 9:1, the ratio between the power of the main beam B1 and the power of one of the auxiliary beams B2 is 9:1/16=144:1. In addition, if this ratio is 1:9, the ratio between the power of the main beam B1 and the power of one of the auxiliary beams B2 is 1:9/16=16:9.

Because the laser beam L illustrated in FIG. 5A has the seven auxiliary beams B2 that are a part of the 16 auxiliary beams B2 and are positioned in front, in the sweep direction SD, of the main beam B1, and the ratio between the power of the main beam B1 and the total of the powers of the 16 auxiliary beams B2 is in the range of 9:1 to 1:9; generation of sputter is able to be reduced. Similarly, in each of the laser beam L' and laser beam L" illustrated in FIG. 5B and FIG. 5C, a part of the auxiliary beams B2 is positioned in front, in the sweep direction SD, of the main beam B1, and the ratio between the power of the main beam B1 and the total of powers of the auxiliary beams B2 is in the range of 9:1 to 1:9; and the generation of sputter is thereby able to be reduced.

Furthermore, in the examples illustrated in FIG. 5A and FIG. 5B, since the auxiliary beams B2 are positioned to form an approximate ring shape with the main beam B1 in the center of the approximate ring shape, even if the sweep direction is changed from the sweep direction SD to any sweep direction, a part of the auxiliary beams B2 is positioned in front, in the sweep direction changed, of the main beam B1. Therefore, the effect of reducing generation of sputter is able to be obtained for any sweep direction. In addition, in the example illustrated in FIG. 5C also, even if the sweep direction is changed from the sweep direction SD to some degree, the effect of reducing generation of sputter is able to be obtained.

Next, as an experimental example, experiments were conducted. In these experiments, plates serving as workpieces, made of SUS 304, which is stainless steel, and having a thickness of 10 mm were irradiated with laser beam using a laser welding apparatus having the configuration illustrated in FIG. 1. The wavelength of laser beam output from the laser device was 1070 nm and the power of the laser beam was 5 kW. The experiments were performed using and not using a diffractive optical element (DOE).

Figure 6:
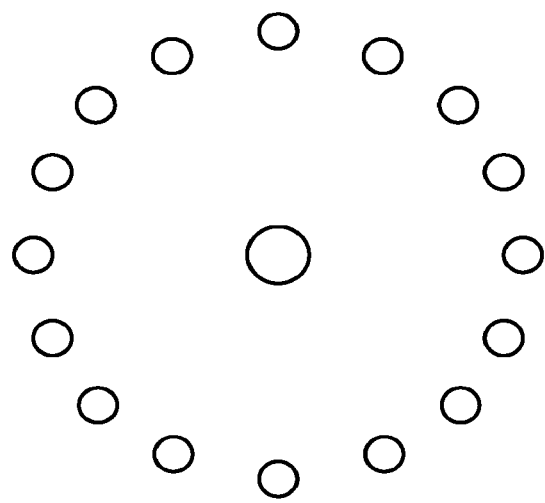
FIG. 6 is a schematic diagram illustrating arrangement of plural beams of laser beam in a case where a DOE is used.

For the use of a DOE, as illustrated in FIG. 6, plural DOEs that had been designed to split laser beam into a main beam and 16 auxiliary beams were prepared, the 16 auxiliary beams being positioned to form an approximate ring shape with the main beam in the center of the approximate ring shape. A diameter 2R of this ring shape was set to be 600 μm on a surface of the workpiece. The sweep direction was upward in FIG. 6. The DOEs were designed such that ratios between the power of the main beam and the total of powers of the 16 auxiliary beams were respectively 9:1, 7:3, 5:5, 3:7, and 1:9 and the 16 auxiliary beams were equal in power. The ratios between the power of the main beam and the total of powers of the 16 auxiliary beams were in the range of 9:1 to 1:9. Therefore, when the ratio was 9:1, the ratio between the power of the main beam and the power of one of the auxiliary beams was 9:1/16=144:1. When the ratio was 1:9, the ratio between the power of the main beam and the power of one of the auxiliary beams was 1:9/16=16:9.

Furthermore, sweep speed for the workpiece with the laser beam was 0.5 m/min, 1 m/min, 2 m/min, 5 m/min, 10 m/min, 20 m/min, or 30 m/min.

Results of the experiments are shown in Table 1. In Table 1, power ratio (center:periphery) refers to the ratio between the power of the main beam and the total of powers of the auxiliary beams. Furthermore, "good" and "okay" indicate results of determination of the degree of scatter of sputter in a time period during which welding of a predetermined length was performed. Specifically, "good" and "okay" indicate by how much the volume of sputter was reduced as compared with a case where a DOE was not used (corresponding to a case where the power ratio was 10:0), when the volume of sputter scattered in that case is defined as 100%. "Good" means that 20% or more of the volume of sputter scattered was reduced as compared with the case where a DOE was not used. "Okay" means that the volume of sputter scattered was reduced as compared to the case where a DOE was not used but the reduction was less than 20%.

As shown in Table 1, when the power ratios were in the range of 9:1 to 1:9, the scattered amounts of sputter were reduced at all sweep speeds.

TABLE 1

| Power ratio (center:periphery) | Sweep speed (m/min) | | | | | | |
| --- | --- | --- | --- | --- | --- | --- | --- |
| | 30 | 20 | 10 | 5 | 2 | 1 | 0.5 |
| 9:1 | Good | Good | Good | Good | Good | Okay | Okay |
| 7:3 | Good | Good | Good | Good | Good | Good | Good |
| 5:5 | Good | Good | Good | Good | Good | Good | Good |
| 3:7 | Good | Good | Good | Good | Good | Good | Good |
| 1:9 | Good | Good | Good | Good | Good | Good | Good |

Figure 7:
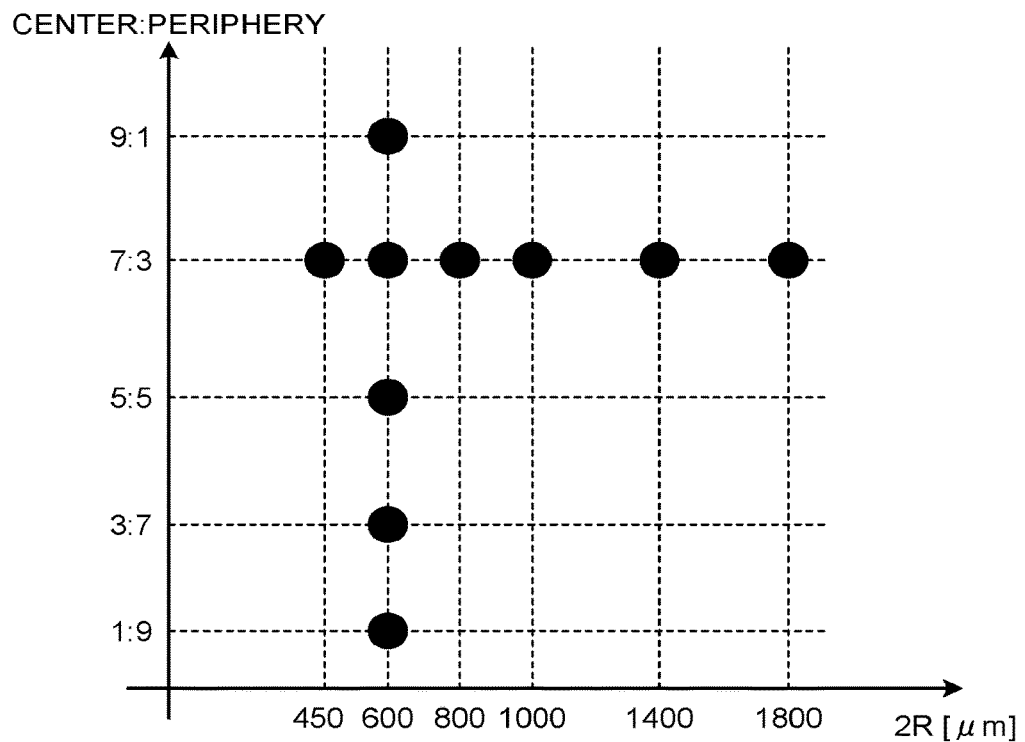
FIG. 7 is a diagram illustrating representative conditions under which states of irradiated spots in experiments were satisfactory.

Subsequently, irradiation experiments similar to the above were conducted using DOEs designed such that the power ratio was 7:3 and diameters 2R of circular approximations of the approximate ring shapes each formed by 16 auxiliary beams on a surface of a workpiece were 450 μm, 600 μm, 800 μm, 1000 μm, 1400 μm, and 1800 μm. The sweep speed was set at 5 m/min. When these DOEs were used, distances were about 225 μm, about 300 μm, about 400 μm, about 500 μm, about 700 μm, and about 900 μm, each of the distances being that between the center of each auxiliary beam and the center of the main beam. As a result of these experiments, scattered amounts of sputter were reduced for all of the diameters 2R. FIG. 7 is a diagram illustrating representative conditions under which the scattered amounts of sputter were reduced in the above described two series of experiments. As evident from these results, the distance between the center of each auxiliary beam and the center of the main beam (corresponding to the radius R) is preferably in the range of 225 μm to 900 μm. The distance between the center of each auxiliary beam positioned forward in the sweep direction and the center of the main beam may be in the range of 225 μm to 900 μm, and distances between the centers of the plural auxiliary beams positioned laterally or rearward in the sweep direction and the center of the main beam may have values outside this range.

Figure 8:
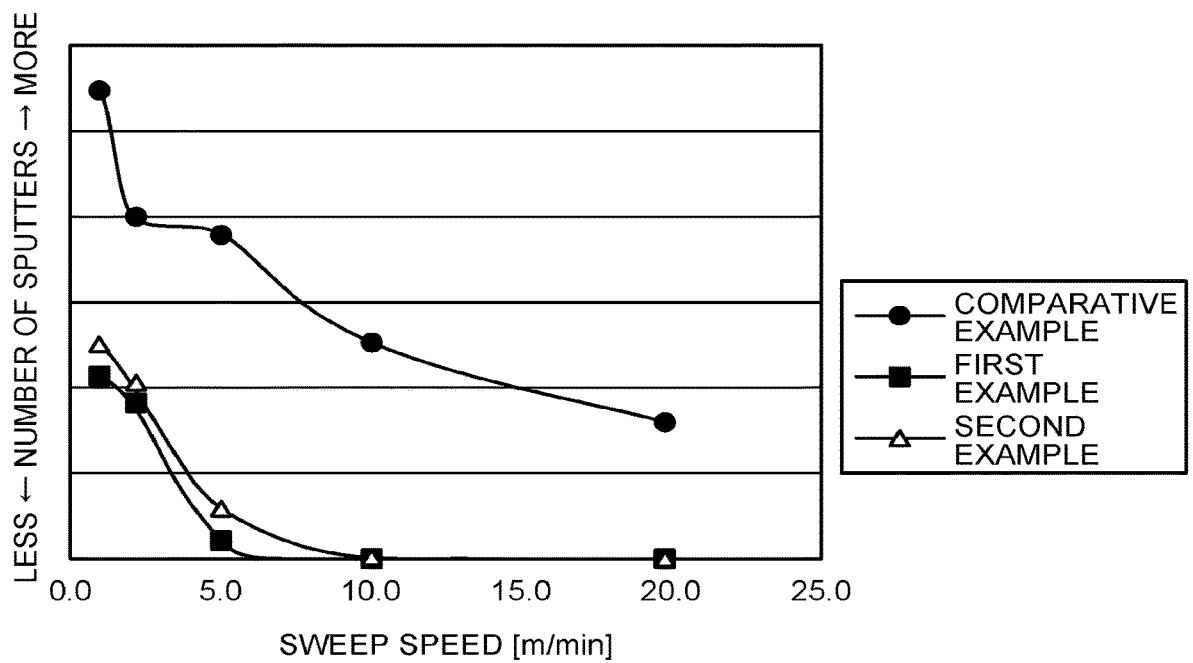
FIG. 8 is a diagram illustrating relations between the sweep speed and the numbers of sputters for a comparative example, a first example, and a second example.

Next, FIG. 8 is a diagram illustrating relations between sweep speeds and the numbers of scattered sputters, for a comparative example, a first example, and a second example. The horizontal axis represents the sweep speed, and the vertical axis represents the number of sputters scattered per weld length of 1 mm, the number being counted by analyzing a video captured by a high-speed camera. The comparative example corresponds to the cases where no DOEs are used in the above described experimental example. The first example corresponds to cases where experiments were performed similarly to the above described experimental example. In these experiments, plates were irradiated with laser beam like that illustrated in FIG. 5C using a laser welding apparatus having the configuration illustrated in FIG. 1. The laser beam was shaped using DOEs and the plates were made of SUS 304, which is stainless steel, and 10 mm in thickness. The wavelength of laser beam output from the laser device was 1070 nm and the power of the laser beam was 5 kW. The distance (corresponding to the radius R) between the center of the main beam and a center of the arc-shaped auxiliary beams was set at 300 μm and the ratio between the power of the main beam and the total of powers of the arc-shaped auxiliary beams was set at 1:2. The arc-shaped auxiliary beams are shaped as a single arc-shaped auxiliary beam that includes plural auxiliary beams approximately equal in power and arranged in an arc shape, the single arc-shaped auxiliary beam having continuously distributed power. The second example corresponds to cases where the diameter 2R is set at 600 μm and the power ratio is set at 3:7 in the above described experimental example.

As illustrated in FIG. 8, in the first example and the second example, the numbers of sputters were decreased significantly as compared to the comparative example, at all sweep speeds.

The cases where the laser beam sweeps the workpieces have been described above. However, forming laser beam with a main beam and plural auxiliary beams and setting the ratio between the power of the main beam and the total of powers of the plural auxiliary beams at 144:1 to 1:9 are also effective for welding, such as spot welding, for example, which does not include sweep of a workpiece with laser beam. The distance between the center of each of the plural auxiliary beams adjacent to the main beam and the center of the main beam is preferably 225 µm to 900 µm.

Other Examples of Beam Arrangement

Other examples of beam arrangement will be described below. For example, in an example illustrated in FIG. 9, laser beam L1 emitted to a workpiece is split into a main beam B1 and three auxiliary beams B2. All of the three auxiliary beams B2 are positioned in front, in the sweep direction SD, of the main beam B1. The power of the main beam B1 is larger than the power of each the auxiliary beams B2. Furthermore, the ratio between the power of the main beam B1 and the total of powers of the three auxiliary beams B2 is in the range of 9:1 to 1:9. This arrangement also enables reduction in generation of sputter, similarly to the above described first embodiment, experimental example, and first and second examples.

Figure 9:
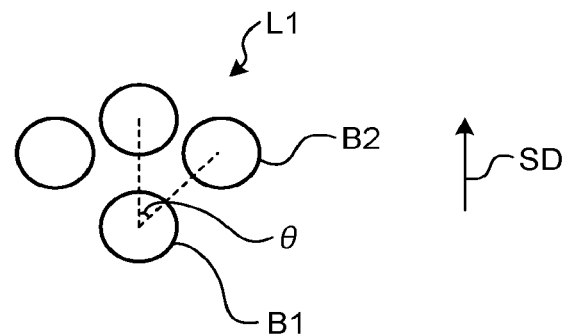
FIG. 9 is a schematic diagram for explanation of another example of beam arrangement.

In the forward beam arrangement like the one illustrated in FIG. 9, an angle θ formed between lines joining the center of the main beam B1 and the centers of two adjacent auxiliary beams B2 is preferably 90° or less, more preferably 60° or less, and more preferably 45° or less.

Furthermore, the shape of the molten pool preferably is nearly line-symmetrical about the sweep direction SD, and thus the three auxiliary beams B2 are also preferably arranged to be line-symmetrical about the sweep direction SD.

Furthermore, as described above by reference to FIG. 6, when laser beam is split into a main beam and 16 auxiliary beams using a DOE, the ratio between the power of the main beam and the power of one of the auxiliary beams may be 144:1. This ratio is applied to a case where laser beam is split into a main beam and two auxiliary beams using a DOE and the two auxiliary beams are positioned in front, in the sweep direction, of the main beam. The ratio between the power of the main beam and the total of powers of the two auxiliary beams then becomes 144:2=72:1. Therefore, the ratio between the power of the main beam and the total of powers of the two auxiliary beams may be 72:1. In addition, in a case where laser beam is split into a main beam and three auxiliary beams using a DOE and the three auxiliary beams are positioned in front, in the sweep direction, of the main beam, like in FIG. 9, for example, the ratio may be 144:3=48:1. Accordingly, the ratio may have a value of 144:1 or more.

Figure 10:
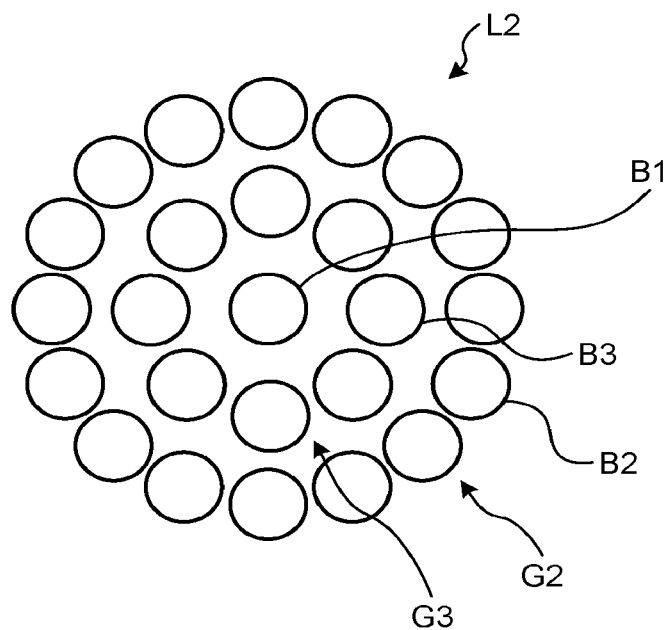
FIG. 10 is a schematic diagram for explanation of yet another example of beam arrangement.

Furthermore, in an example illustrated in FIG. 10, for example, laser beam L2 emitted to a workpiece is split into a main beam B1, 16 auxiliary beams B2, and eight auxiliary beams B3. The 16 auxiliary beams B2 form an auxiliary beam group G2 and are positioned to form an approximate ring shape with the main beam B1 in the center. The eight auxiliary beams B3 form an auxiliary beam group G3 and are positioned to form an approximate ring shape with the main beam B1 in the center and a diameter smaller than that of the ring shape formed by the auxiliary beams B2. The ratio between the power of the main beam B1 and the total of powers of the auxiliary beams B2 and auxiliary beams B3 is in the range of 9:1 to 1:9. This arrangement also enables reduction in generation of sputter, similarly to the above described first embodiment, experimental example, and first and second examples.

Figure 11A:
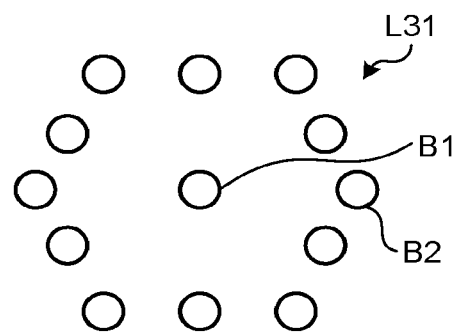
FIG. 11A is a schematic diagram for explanation of still another example of beam arrangement.
Figure 11B:
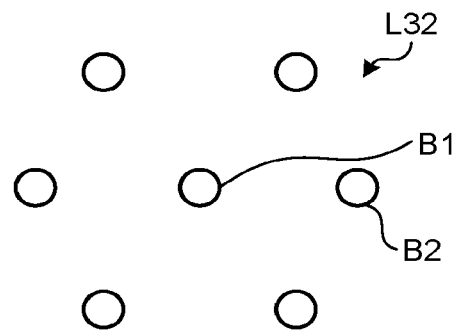
FIG. 11B is a schematic diagram for explanation of yet another example of beam arrangement.
Figure 11C:
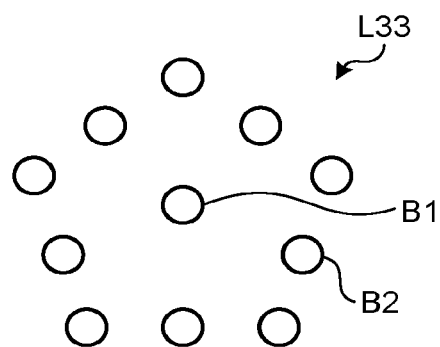
FIG. 11C is a schematic diagram for explanation of still another example of beam arrangement.
Figure 11D:
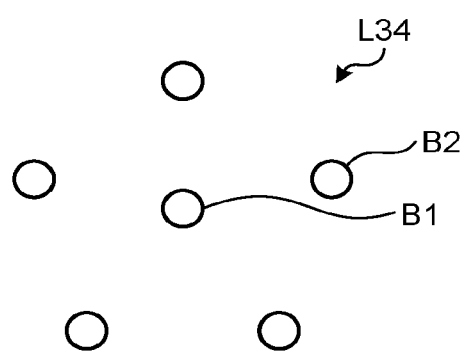
FIG. 11D is a schematic diagram for explanation of yet another example of beam arrangement.
Figure 11E:
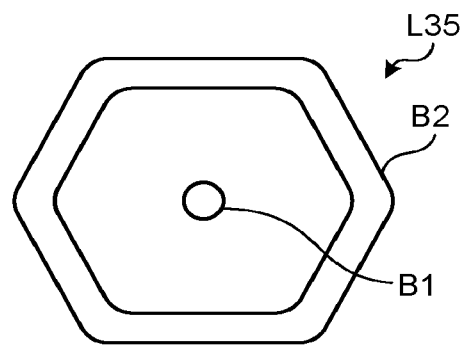
FIG. 11E is a schematic diagram for explanation of still another example of beam arrangement.
Figure 11F:
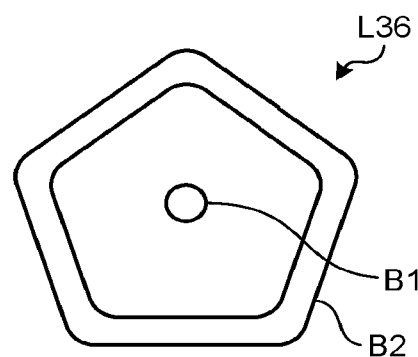
FIG. 11F is a schematic diagram for explanation of yet another example of beam arrangement.
Figure 11G:
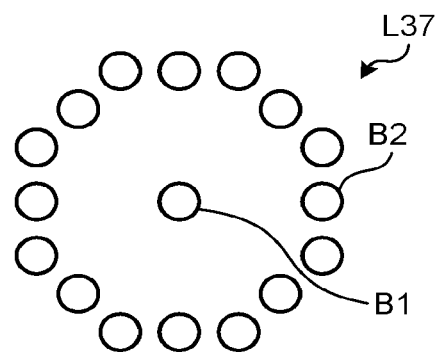
FIG. 11G is a schematic diagram for explanation of still another example of beam arrangement.
Figure 11H:
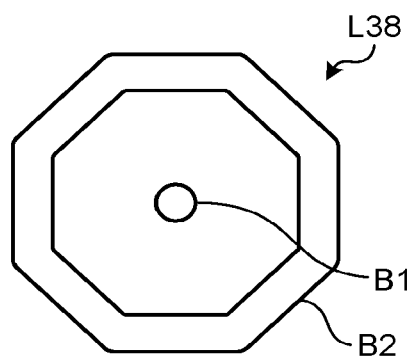
FIG. 11H is a schematic diagram for explanation of yet another example of beam arrangement.
Figure 11I:
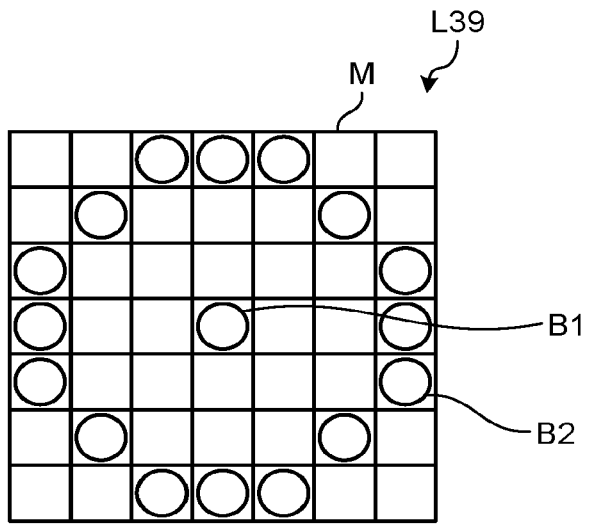
FIG. 11I is a schematic diagram for explanation of still another example of beam arrangement.

FIG. 11A to FIG. 11I are schematic diagrams for explanation of yet other examples of beam arrangement. In an example illustrated in FIG. 11A, laser beam L31 includes a main beam B1 and twelve auxiliary beams B2. The twelve auxiliary beams B2 are positioned to form an approximate ring shape or an approximate regular hexagonal shape, with the main beam B1 in the center. In an example illustrated in FIG. 11B, laser beam L32 includes a main beam B1 and six auxiliary beams B2. The six auxiliary beams B2 are positioned to form an approximate ring shape or hexagonal shape, with the main beam B1 in the center. In an example illustrated in FIG. 11C, laser beam L33 includes a main beam B1 and ten auxiliary beams B2. The ten auxiliary beams B2 are positioned to form an approximate ring shape or pentagonal shape, with the main beam B1 in the center. In an example illustrated in FIG. 11D, laser beam L34 includes a main beam B1 and five auxiliary beams B2. The five auxiliary beams B2 are positioned to form an approximate ring shape or pentagonal shape, with the main beam B1 in the center. In an example illustrated in FIG. 11E, laser beam L35 includes a main beam B1 and an auxiliary beam B2. The auxiliary beam B2 includes plural auxiliary beams that overlap each other such that their power is continuously distributed, the plural auxiliary beams being positioned to form an approximate ring shape or hexagonal shape, with the main beam B1 in the center. In an example illustrated in FIG. 11F, laser beam L36 includes a main beam B1 and an auxiliary beam B2. The auxiliary beam B2 includes plural auxiliary beams that overlap each other such that their power is continuously distributed, the plural auxiliary beams being positioned to form an approximate ring shape or pentagonal shape, with the main beam B1 in the center. In an example illustrated in FIG. 11G, laser beam L37 includes a main beam B1 and 16 auxiliary beams B2. The 16 auxiliary beams B2 are positioned to form an approximate ring shape or an approximate regular octagonal shape, with the main beam B1 in the center. In an example illustrated in FIG. 11H, laser beam L38 includes a main beam B1 and an auxiliary beam B2. The auxiliary beam B2 includes plural auxiliary beams that overlap each other such that their power is continuously distributed, the plural auxiliary beams being positioned to form an approximate ring shape or octagonal shape, with the main beam B1 in the center. In the examples illustrated in FIG. 11A to FIG. 11H, the sweep direction of the laser beam L31 to L38 may be in any direction, and may be in a direction not heading to a corner of the pentagon, hexagon, or octagon. Furthermore, the number of auxiliary beams that are not in the front in the sweep direction may be thinned out a little if the auxiliary beams are closely arranged as illustrated in FIG. 11A, FIG. 11C, or FIG. 11G. In addition, in an example illustrated in FIG. 11I, laser beam L39 includes a main beam B1 and 16 auxiliary beams B2. The 16 auxiliary beams B2 are positioned to form an approximate ring shape or an approximate octagonal shape, with the main beam B1 in the center. The main beam B1 and the auxiliary beams B2 are arranged to fill rectangles of a grid defined by a matrix M.

Second Embodiment

Figure 12:
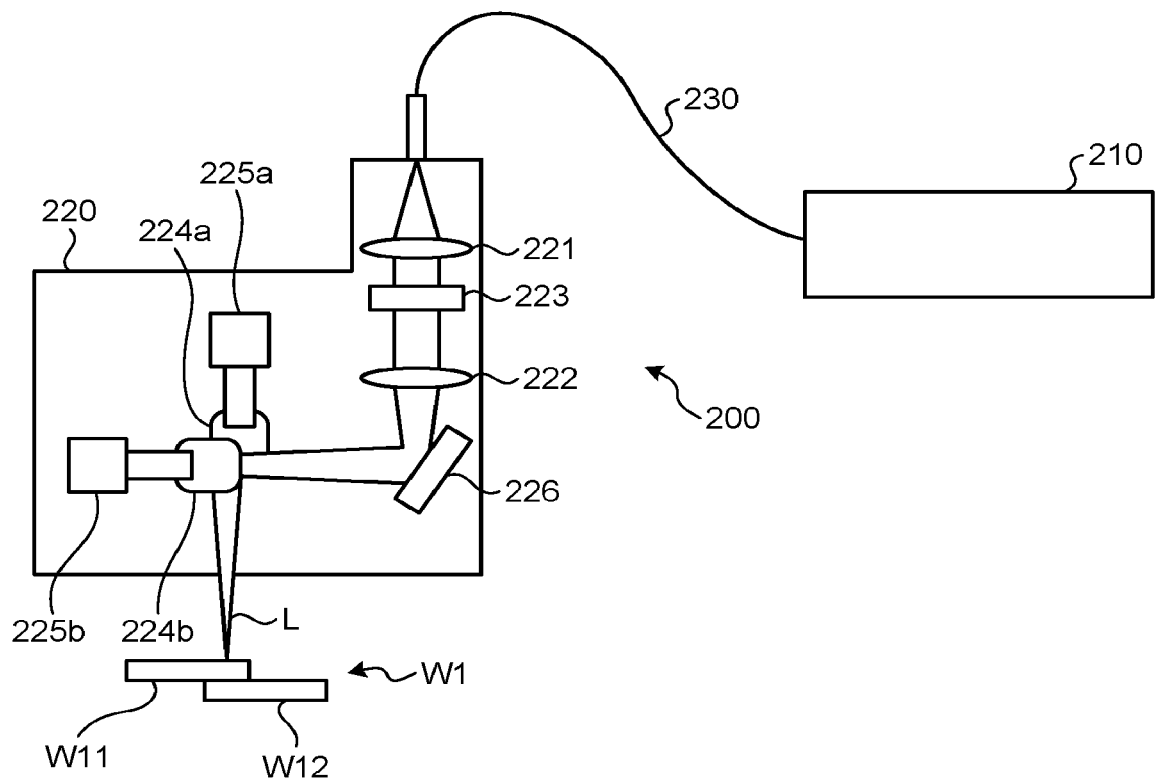
FIG. 12 is a diagram illustrating a schematic configuration of a laser welding apparatus according to a second embodiment.

FIG. 12 is a diagram illustrating a schematic configuration of a laser welding apparatus according to a second embodiment. A laser welding apparatus 200 irradiates a workpiece W1 with laser beam L to perform welding of the workpiece W1. The workpiece W1 is formed of two plate-like metallic members W11 and W12 superimposed on each other. The laser welding apparatus 200 implements welding by principles that are similar to those of the laser welding apparatus 100. Therefore, only a device configuration of the laser welding apparatus 200 will be described below.

The laser welding apparatus 200 includes a laser device 210, an optical head 220, and an optical fiber 230.

The laser device 210 includes a laser oscillator, is configured similarly to the laser device 110, and is configured to be able to output laser beam having a power of, for example, a few kilowatts (kW). The optical fiber 230 guides the laser beam output from the laser device 210 to input the laser beam to the optical head 220.

Similarly to the optical head 120, the optical head 220 is an optical device for emitting the laser beam input from the laser device 210, to the workpiece W1. The optical head 220 includes a collimator lens 221 and a condenser lens 222.

Furthermore, the optical head 220 has a galvanoscanner placed between the condenser lens 222 and the workpiece W1. The galvanoscanner is a device that moves the position irradiated with the laser beam L to enable sweeping with the laser beam L without moving the optical head 220, by controlling the angles of two mirrors 224a and 224b. The laser welding apparatus 200 includes a mirror 226 for guiding the laser beam L emitted from the condenser lens 222, to the galvanoscanner. The angles of the mirrors 224a and 224b of the galvanoscanner are respectively changed by motors 225a and 225b.

The optical head 220 includes a diffractive optical element 223 placed between the collimator lens 221 and the condenser lens 222 and serving as a beam shaper. Similarly to the diffractive optical element 123, the diffractive optical element 223 splits laser beam input from the collimator lens 221, into a main beam and at least one auxiliary beam. At least a part of the at least one auxiliary beam is positioned in front, in a sweep direction, of the main beam. The power of the main beam is larger than the power of each auxiliary beam, and a ratio between the power of the main beam and the total of powers of the at least one auxiliary beam is in the range of 9:1 to 1:9. The laser welding apparatus 200 is thereby able to reduce generation of sputter in welding of the workpiece W1. The ratio may be in the range of 144:1 to 1:9, depending on how the splitting and arrangement of the auxiliary beams are done.

Third Embodiment

Figure 13:
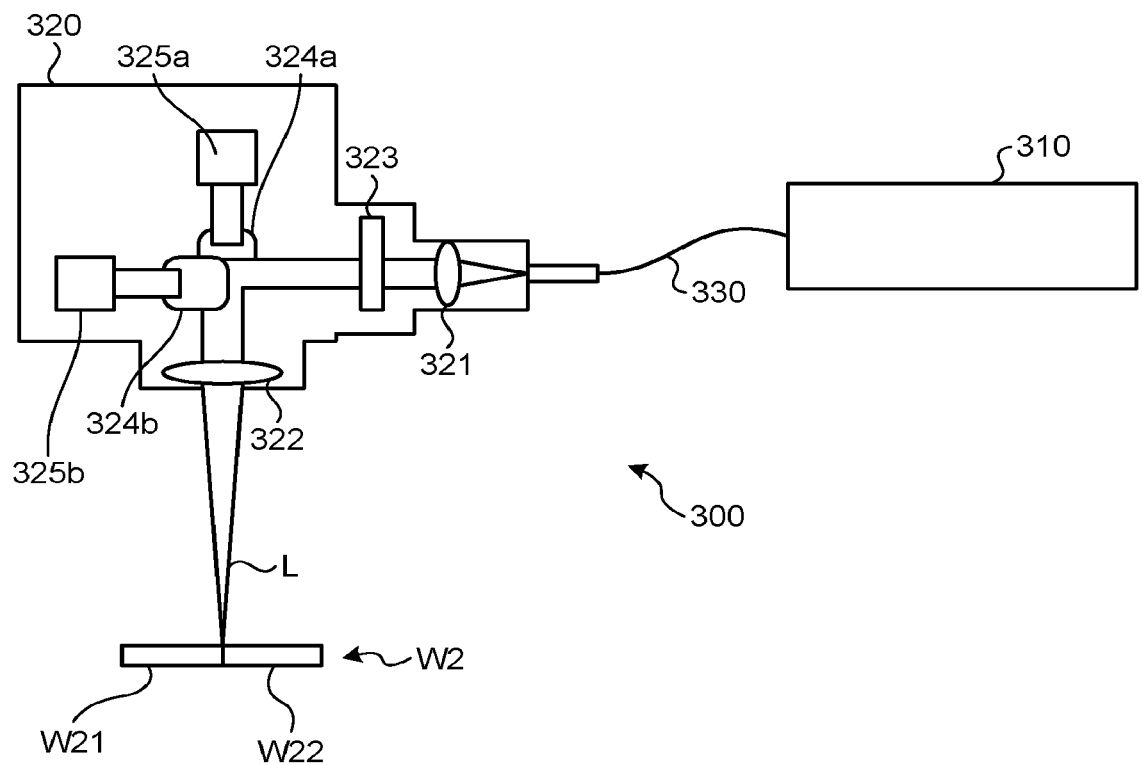
FIG. 13 is a diagram illustrating a schematic configuration of a laser welding apparatus according to a third embodiment.

FIG. 13 is a diagram illustrating a schematic configuration of a laser welding apparatus according to a third embodiment. A laser welding apparatus 300 irradiates a workpiece W2 with laser beam L to perform welding of the workpiece W2. The workpiece W2 is formed of two plate-like metallic members W21 and W22 adjacently laid to butt against each other. The laser welding apparatus 300 includes a laser oscillator and implements welding by principles that are similar to those of the laser welding apparatuses 100 and 200. The configurations of elements (a laser device 310 and an optical fiber 330) other than an optical head 320 are similar to the corresponding elements of the laser welding apparatuses 100 and 200. Therefore, only a device configuration of the optical head 320 will be described below.

Similarly to the optical heads 120 and 220, the optical head 320 is an optical device for emitting laser beam input from the laser device 310, to the workpiece W2. The optical head 320 includes a collimator lens 321 and a condenser lens 322.

Furthermore, the optical head 320 has a galvanoscanner placed between the collimator lens 321 and the condenser lens 322. Angles of mirrors 324a and 324b of the galvanoscanner are respectively changed by motors 325a and 325b. In the optical head 320, the galvanoscanner is provided at a position different from that in the optical head 220. However, similarly to the optical head 220, by controlling the angles of the two mirrors 324a and 324b, the position irradiated with laser beam L is moved to enable sweeping with the laser beam L, without moving the optical head 320.

The optical head 320 includes a diffractive optical element 323 placed between the collimator lens 321 and the condenser lens 322 and serving as a beam shaper. Similarly to the diffractive optical elements 123 and 223, the diffractive optical element 323 splits the laser beam input from the collimator lens 321 to generate a main beam and at least one auxiliary beam. At least a part of the at least one auxiliary beam is positioned in front, in a sweep direction, of the main beam. The power of the main beam is larger than the power of each auxiliary beam, and a ratio between the power of the main beam and the total of powers of the at least one auxiliary beam is in the range of 9:1 to 1:9. The laser welding apparatus 300 is thereby able to reduce generation of sputter in welding of the workpiece W2. The ratio may be in the range of 144:1 to 1:9, depending on how the splitting and arrangement of the auxiliary beams are done.

Fourth Embodiment

Figure 14:
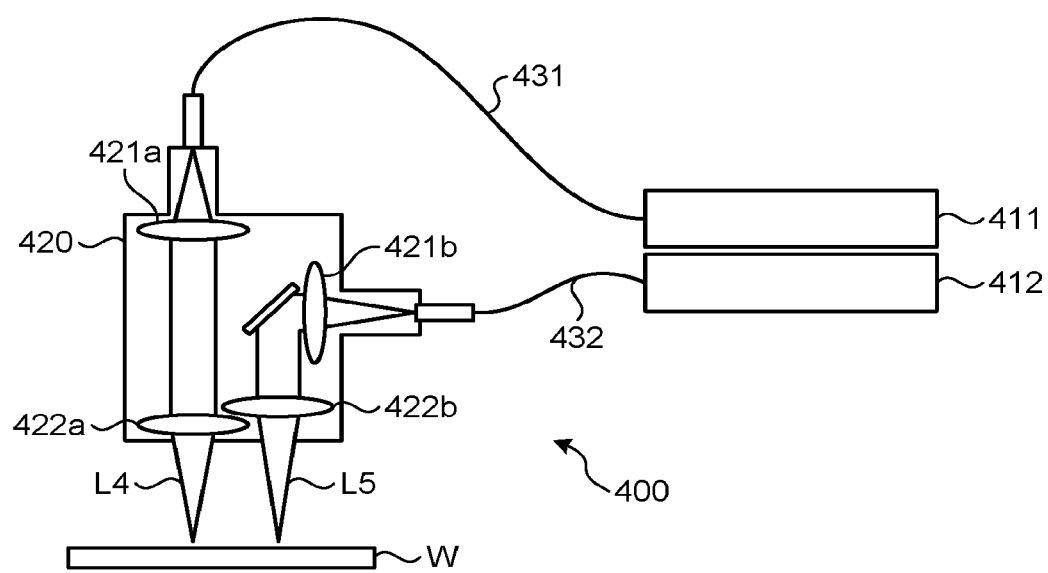
FIG. 14 is a diagram illustrating a schematic configuration of a laser welding apparatus according to a fourth embodiment.

FIG. 14 is a diagram illustrating a schematic configuration of a laser welding apparatus according to a fourth embodiment. As illustrated in FIG. 14, a laser welding apparatus 400 according to the fourth embodiment is an example of a configuration of a device that melts a workpiece W by irradiating the workpiece W with laser beam L4 and laser beam L5. The laser welding apparatus 400 implements a welding method by principles that are similar to those of the welding apparatus according to the first embodiment. Therefore, only a device configuration of the laser welding apparatus 400 will be described below.

The laser welding apparatus 400 includes plural oscillators 411 and 412 that output laser beams, an optical head 420 that emits laser beams to the workpiece W, and optical fibers 431 and 432 that guide the laser beam output by the oscillators 411 and 412 to the optical head 420.

The oscillators 411 and 412 are configured to be capable of outputting, for example, multi-mode laser beam at a power of a few kilowatts (kW). For example, each of the oscillators 411 and 412 may have plural semiconductor laser devices inside and be configured to output multi-mode laser beam at a power of a few kilowatts (kW) as the total output of the plural semiconductor laser devices, or any of various lasers including fiber lasers, YAG lasers, and disk lasers may be used instead.

The optical head 420 is an optical device for condensing the laser beam L4 and laser beam L5 respectively guided from the oscillators 411 and 412 to power densities of strengths enabling the workpiece W to be melted and for irradiating the workpiece W with the condensed laser beam L4 and laser beam L5. Therefore, the optical head 420 includes a collimator lens 421a and a condenser lens 422a for the laser beam L4, and a collimator lens 421b and a condenser lens 422b for the laser beam L5. The collimator lenses 421a and 421b are optical systems for making laser beam guided by the optical fibers 431 and 432 into collimated light once and the condenser lenses 422a and 422b are optical systems for condensing the collimated laser beam onto the workpiece W.

This optical head 420 also has a function to cause the laser beam L4 and laser beam L5 on the workpiece W to include a main beam and at least one auxiliary beam, at least a part of the at least one auxiliary beam being in front, in a sweep direction, of the main beam. That is, of the laser beam L4 and laser beam L5 emitted to the workpiece W by the optical head 420, the laser beam L4 may be used for formation of the main beam and the laser beam L5 may be used for formation of the auxiliary beam. The power of the main beam is larger than the power of each auxiliary beam, and a ratio between the power of the main beam and the total of powers of the at least one auxiliary beam is in the range of 9:1 to 1:9. This ratio may be in the range of 144:1 to 1:9, depending on how the splitting and arrangement of the auxiliary beams are done. Furthermore, only two sets of laser beam, the laser beam L4 and laser beam L5, are used in the example illustrated in FIG. 14, but the number of sets of laser beam may be increased as appropriate, as long as they are formed to provide laser beam suitable for embodying the present disclosure, like the laser beam having the cross-sectional shapes exemplified by FIG. 3, FIG. 5, and FIG. 9 to FIG. 11.

In this fourth embodiment, the laser beam L4 and laser beam L5 are generated by using the two oscillators 411 and 412. However, laser beam output from a single oscillator may be split into two by an optical divider to generate the laser beam L4 and laser beam L5. Furthermore, in this fourth embodiment, the optical fibers 431 and 432, the collimator lens 421a and condenser lens 422a, and the collimator lens 421b and condenser lens 422b are individually included for the two oscillators 411 and 412, respectively. However, by using a multi-core fiber including two or more cores instead of the optical fibers 431 and 432, sets of laser beam output respectively from the two oscillators 411 and 412 may be guided to an optical head through separate cores, and the optical head may emit the two sets of laser beam serving as the laser beam suitable for embodying the present disclosure, to a workpiece, the optical head using a collimator lens and a condenser lens common to the two sets of laser beam.

Furthermore, in the above described embodiments, the profile of the laser beam (power distribution profile) has discrete power regions formed of the main beam and auxiliary beams. A power region is a region having power contributing to melting of a workpiece, the region being in a plane perpendicular to the direction in which laser beam travels. However, having power enabling melting of a workpiece is not necessarily required for an individual power region alone, and each power region may just be capable of melting the workpiece by influence of energy given to the workpiece by the other power regions.

Figure 15A:
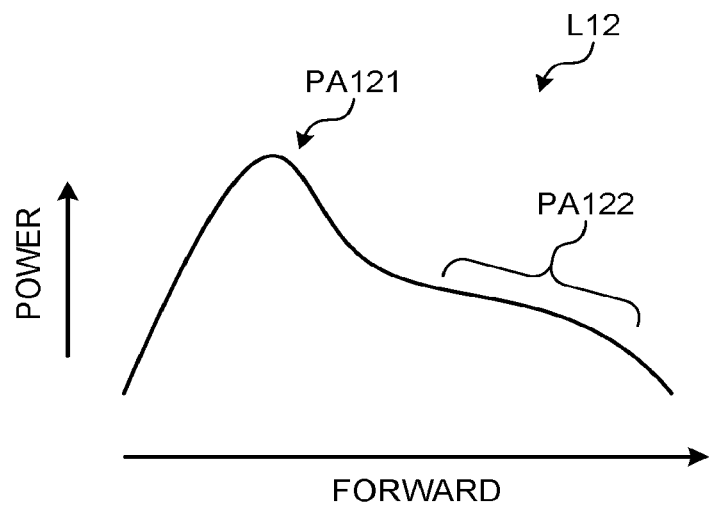
FIG. 15A is a schematic diagram for explanation of an example of a power distribution profile of laser beam.

However, the power regions are not necessarily discrete, and plural power regions may be continuous with a line-symmetrical or asymmetrical distribution. For example, FIG. 15A illustrates a power distribution profile of an area of laser beam L12, the area being in the front. The laser beam L12 is an example of laser beam having a power distribution profile different from that of the laser beam L. In this power distribution profile of the laser beam L12, two power regions PA121 and PA122 that are arranged in the front are continuous. The power region PA121 has a single-peaked pattern with a peak, and is, for example, a main power region. The power region PA122 has a shoulder pattern, and is, for example, an auxiliary power region. A boundary between the two power regions PA121 and PA122 in the curve of FIG. 15A may be defined, for example, as the position of an inflection point present between the two power regions PA121 and PA122.

Figure 15B:
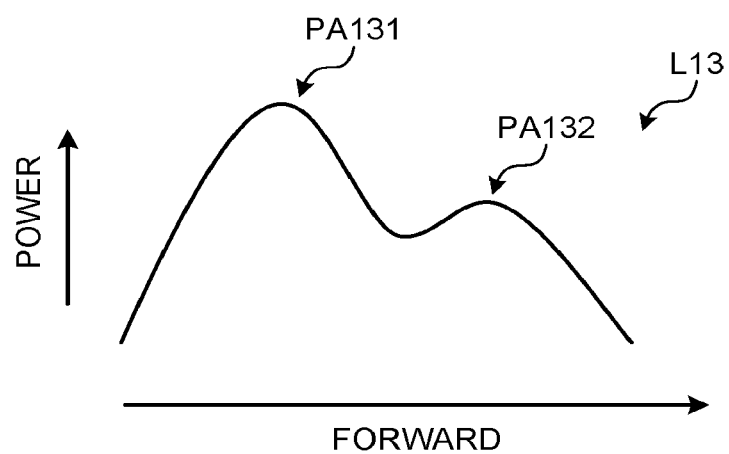
FIG. 15B is a schematic diagram for explanation of an example of a power distribution profile of laser beam.

FIG. 15B on the other hand illustrates a power distribution profile of an area of laser beam L13, the area being in the front. The laser beam L13 is another example of laser beam having a power distribution profile different from that of the laser beam L. In this power distribution profile of the laser beam L13, two power regions PA131 and PA132 that are arranged are continuous. The power regions PA131 and PA132 each have a single-peaked pattern with a peak, and are for example, a main power region and an auxiliary power region, respectively. A boundary between the two power regions PA131 and PA132 in the curve of FIG. 15B may be defined, for example, as the position of the local minimum point present between the two power regions PA131 and PA132. Each of the laser beam L12 and laser beam L13 may be used as laser beam formed of a main power region and an auxiliary power region according to the present disclosure. The laser beam L12 and laser beam L13 may be obtained by using optical components, such as, for example: diffractive optical elements and optical lenses serving as beam shapers and designed appropriately; and optical fibers that are able to control power distributions. Similarly, power distribution profiles of other forms of laser beam each formed of a main power region and an auxiliary power region according to the present disclosure, such as the laser beam L, laser beam L', laser beam L", laser beam L1, laser beam L2, and laser beam L31 to laser beam L38, may also be achieved by using optical components, such as, for example: diffractive optical elements and optical lenses serving as a beam shaper and designed appropriately; and optical fibers that are able to control power distributions.

The form of welding with the main beam (main power region) in each of the embodiments in this specification may be keyhole welding or heat conduction welding. Keyhole welding referred to herein is a welding method using keyholes. Heat conduction welding on the hand is a welding method in which heat generated by absorption of laser beam at a surface of a workpiece is used to melt the workpiece.

Furthermore, all of the auxiliary beams may have the same power, or one or more of the auxiliary beams may be higher in power than the other auxiliary beams. In addition, plural auxiliary beams may be classified into plural groups, auxiliary beams in the same group may substantially have the same power, and auxiliary beams in different groups may differ in power. In this case, when auxiliary beams classified into different groups are compared with each other, they differ in power in a stepwise manner. The number of auxiliary beams included in a group is not necessarily plural and may be singular. In any case, the ratio between the power of the main beam and the total of powers of the plural auxiliary beams is preferably 144:1 to 1:9.

Furthermore, workpieces are not limited to plates and forms of welding are not limited to lap welding and butt welding. Therefore, a workpiece may be formed by superimposing at least two members to be welded on each other, bringing them into contact with each other, or laying them adjacently to each other.

Furthermore, when sweeping a workpiece with laser beam, sweeping may be performed by a known technique, such as wobbling, weaving, or output modulation, to adjust the surface area of the molten pool.

Furthermore, like a plated metallic plate, a workpiece may have, on its metallic surface, a thin layer of another metal. In addition, workpieces having thicknesses of about 1 mm to 10 mm have been described as examples, but the workpieces may be thinner at about 0.01 mm or may be thicker.

The present disclosure is not limited by the above described embodiments. The present disclosure also includes those configured by combination of any of the above described components of the embodiments as appropriate. Furthermore, further effects and modifications can be easily derived by those skilled in the art. Therefore, wider aspects of the present disclosure are not limited to the above described embodiments and various modifications may be made.

INDUSTRIAL APPLICABILITY

The present disclosure may be utilized in laser welding.

The present disclosure has an effect of enabling reduction in generation of sputter.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A welding method comprising:
emitting laser beam toward a workpiece including a metal to melt and weld a part of the workpiece, the part being where the laser beam has been emitted to, wherein:
the laser beam includes a main power region and at least one auxiliary power region,
a power of the main power region is larger than a power of each of the at least one auxiliary power region, and
a ratio between the power of the main power region and the total of powers of the at least one auxiliary power region is in a range of 144:1 to 1:9,
the laser beam includes a plurality of the auxiliary power regions, and the plurality of auxiliary regions is positioned so as to surround at least a part of a periphery of the main power region, and
a distance between a center of each of the auxiliary power regions and a center of the main power region is in a range of 225 µm to 900 µm.

2. The welding method according to claim 1, wherein the metal is iron, alloy steel including iron, steel, an alloy including steel, aluminum, or an alloy including aluminum.

3. The welding method according to claim 1, wherein the plurality of auxiliary power regions has substantially a ring shape surrounding the main power region, or an arc shape that is a part of substantially a ring shape surrounding the periphery of the main power region.

4. The welding method according to claim 1, wherein the laser beam and the workpiece move relatively to each other.

5. The welding method according to claim 1, wherein the workpiece includes at least two members to be welded, and when the workpiece is placed in a region where the laser beam is emitted to, the at least two members are superimposed on each other, brought into contact with each other, or laid adjacently to each other.

6. The welding method according to claim 1, wherein the metal is SUS 304.

7. The welding method according to claim 1, wherein the main power region and the auxiliary power region or regions are formed by a beam shaper.

8. The welding method according to claim 7, wherein the beam shaper is a diffractive optical element.

9. A welding apparatus, comprising:
a laser oscillator; and
an optical head that receives light emitted from the laser oscillator to generate laser beam, and emits the generated laser beam to a workpiece to melt and weld an area of the workpiece, the area being where the laser beam has been emitted to, wherein:
the laser beam includes a main power region and at least one auxiliary power region,
a power of the main power region is larger than a power of each of the at least one auxiliary power region, and
a ratio between the power of the main power region and the total of powers of the at least one auxiliary power region is in a range of 144:1 to 1:9,
the laser beam includes a plurality of the auxiliary power regions, and the plurality of auxiliary regions is positioned so as to surround at least a part of a periphery of the main power region, and
a distance between a center of each of the auxiliary power regions and a center of the main power region is in a range of 225 µm to 900 µm.

10. The welding apparatus according to claim 9, wherein the workpiece includes a metal, and the metal is iron, alloy steel including iron, steel, an alloy including steel, aluminum, or an alloy including aluminum.

11. The welding apparatus according to claim 9, wherein the plurality of auxiliary power regions has substantially a ring shape surrounding the main power region, or an arc shape that is a part of substantially a ring shape surrounding the periphery of the main power region.

12. The welding apparatus according to claim 9, wherein the laser beam and the workpiece move relatively to each other.

13. The welding apparatus according to claim 9, wherein the workpiece is formed of at least two members to be welded that are superimposed on each other, brought into contact with each other, or laid adjacently to each other.

14. The welding apparatus according to claim 9, comprising a beam shaper that generates the main power region and the auxiliary power region or regions.

15. The welding apparatus according to claim 14, wherein the beam shaper is a diffractive optical element.

* * * * *